United States Patent
Young Tan et al.

(10) Patent No.: US 11,615,518 B2
(45) Date of Patent: Mar. 28, 2023

(54) METHOD FOR GENERATING A RECONSTRUCTED IMAGE

(71) Applicants: Inventec (Pudong) Technology Corporation, Shanghai (CN); INVENTEC CORPORATION, Taipei (TW)

(72) Inventors: Daniel Stanley Young Tan, Taipei (TW); Yi-Chun Chen, Taipei (TW); Trista Pei-Chun Chen, Taipei (TW); Wei-Chao Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 278 days.

(21) Appl. No.: 17/171,147

(22) Filed: Feb. 9, 2021

(65) Prior Publication Data

US 2022/0156910 A1 May 19, 2022

(30) Foreign Application Priority Data

Nov. 19, 2020 (CN) .......................... 202011298764.5

(51) Int. Cl.
*G06T 7/00* (2017.01)
*G06K 9/62* (2022.01)
(Continued)

(52) U.S. Cl.
CPC .......... *G06T 7/0002* (2013.01); *G06K 9/6256* (2013.01); *G06T 1/0014* (2013.01); *G06V 10/443* (2022.01)

(58) Field of Classification Search
CPC ................. G06T 7/0002; G06T 1/0014; G06T 2207/20081; G06T 2207/20084; G06T 2207/30108; G06T 7/0004; G06T 11/00; G06T 5/002; G06T 7/11; G06T 2207/10004; G06K 9/6256; G06K 9/6215; G06V 10/443; G06V 10/82; G06V 10/993
(Continued)

(56) References Cited

U.S. PATENT DOCUMENTS

| 11,436,710 | B2* | 9/2022 | Wang ......................... G06T 5/50 |
| 2019/0259134 | A1* | 8/2019 | Rainy ....................... G06N 3/08 |
| 2020/0364910 | A1* | 11/2020 | Price ..................... G06V 10/454 |

* cited by examiner

*Primary Examiner* — Neil R McLean
(74) *Attorney, Agent, or Firm* — Locked Lord LLP; Tim Tingkang Xia, Esq.

(57) ABSTRACT

A method for generating reconstruction a reconstructed image is adapted to an input image having a target object. The method comprises converting the input image into a feature map with vectors by an encoder; performing a training procedure according to training images of reference objects to generate feature prototypes associated with the training images and store the feature prototypes to a memory; selecting a part of feature prototypes from the feature prototypes stored in the memory according to similarities between the feature prototypes and the feature vectors; generating a similar feature map according the part of feature prototypes and weights, wherein the weights represents similarities between the part of feature prototypes and the feature vectors; and converting the similar feature map into the reconstructed image by a decoder; wherein the encoder, the decoder and the memory form an auto-encoder.

8 Claims, 6 Drawing Sheets

(51) Int. Cl.
*G06T 1/00* (2006.01)
*G06V 10/44* (2022.01)

(58) Field of Classification Search
USPC .......................................................... 382/100
See application file for complete search history.

METHOD FOR GENERATING A RECONSTRUCTED IMAGE

CROSS-REFERENCE TO RELATED APPLICATIONS

This non-provisional application claims priority under 35 U.S.C. § 119(a) on Patent Application No(s). 202011298764.5 filed in China on Nov. 19, 2020, the entire contents of which are hereby incorporated by reference.

BACKGROUND

1. Technical Field

The present disclosure relates to defect detection of products based on images, and more particularly to a method for generating a reconstructed image applied to the front end of defect detection.

2. Related Art

For manufacturers, product appearance assessment is an essential step in quality assurance. Undetected defects, such as scratches, bumps, and discolorations, can result in costly product returns and losing customer's trust. Today, most appearance inspection tasks are still performed by inspectors manually because of the difficulty of describing various defects using traditional computer vision algorithms in the automatic optical inspection machines (AOIs). However, managing inspectors has been a significant management problem because it is difficult to maintain a consistent inspection standard across different product lines.

The object detector networks have been proposed to address the above problem in the past. However, these fully-supervised models require datasets with clearly annotated bounding boxes, which can be laborious and equally tricky to label with consistency. Additionally, because these methods tend to perform poorly for defects not present in the dataset, it can take an indefinite amount of time to collect sufficient training data. It will take a lot of time on data collection for sufficient defect types, which is unacceptable for products with relatively short life cycles.

Instead of relying on explicitly labeled defects, it is possible to learn the distribution from normal samples and treat those deviating too far as defects, thus enabling the models to detect previously unseen defects. For example, an auto-encoder can erase defects from the input images upon trained with normal images. However, in practice, the auto-encoders can become overly general and learn to reconstruct the defects. In particular, when the surfaces of the product contain lots of texture, the reconstructions can be erratic, leading to many false-positives.

In view of the above, while the generative approaches do not require detailed labeling of the images, they often assume the input data are free of images of defected product. As a result, the algorithms can become overly sensitive to noise when images of defected product accidentally leak into the dataset, which frequently occurs in many manufacturing facilities. Furthermore, many input images tend to contain some imperfections, and if these imperfect images are excluded, the percentage of normal images would undoubtedly drop.

SUMMARY

Accordingly, the present disclosure provides a method for generating a reconstructed image, and thereby reducing the common over-generalization of the defect detection based on the auto-encoder.

According to one or more embodiment of this disclosure, a method for generating a reconstructed image adapted to an input image having a target object, comprising: converting the input image into a feature map with a plurality of feature vectors by an encoder; performing a training procedure according to a plurality of training images of a plurality of reference objects to generate a plurality of feature prototypes associated with the plurality of training images and storing the plurality of feature prototypes to a memory; selecting a part of feature prototypes from the plurality of feature prototypes stored in the memory according to a plurality of similarities between the plurality of feature prototypes and the plurality of feature vectors; generating a similar feature map according the part of feature prototypes and a plurality of weights, wherein each of the plurality of weights represents each of the similarities between the part of feature prototypes and the plurality of feature vectors; and converting the similar feature map into the reconstructed image by a decoder, wherein the encoder, the decoder and the memory form an auto-encoder In view of the above, the method for generating a reconstructed image proposed in the present disclosure has the following contributions: a defect classification framework implemented by the present disclosure is resilient to noise in the training dataset, the novel sparse memory addressing scheme proposed in the present disclosure may avoid over-generalization of memory slots for the auto-encoder, and the memory update scheme using trust regions may avoid noise contamination in memory slots during the training stage.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present disclosure proposes a method for generating a reconstructed image which may generate a reconstructed image through the reconstruction model implemented according to an embodiment of the present disclosure and an input image. The input image is an image of a target object. For example, the target object is a circuit board or a top cover of the laptop. The target object is possible to have defects, such as scratches, bumps, and discolorations. The reconstructed image may be viewed as an input image without defects.

An unsupervised defect detection process is briefly described as follows. A processor uses the reconstruction model to generate the reconstructed image according to the input image, examines the difference between the reconstructed image and the input image, and determines that the input image has defects when the difference exceeds a threshold. As mentioned above, the performance of the defect detector depends on the performance of the reconstruction model.

Figure 1:
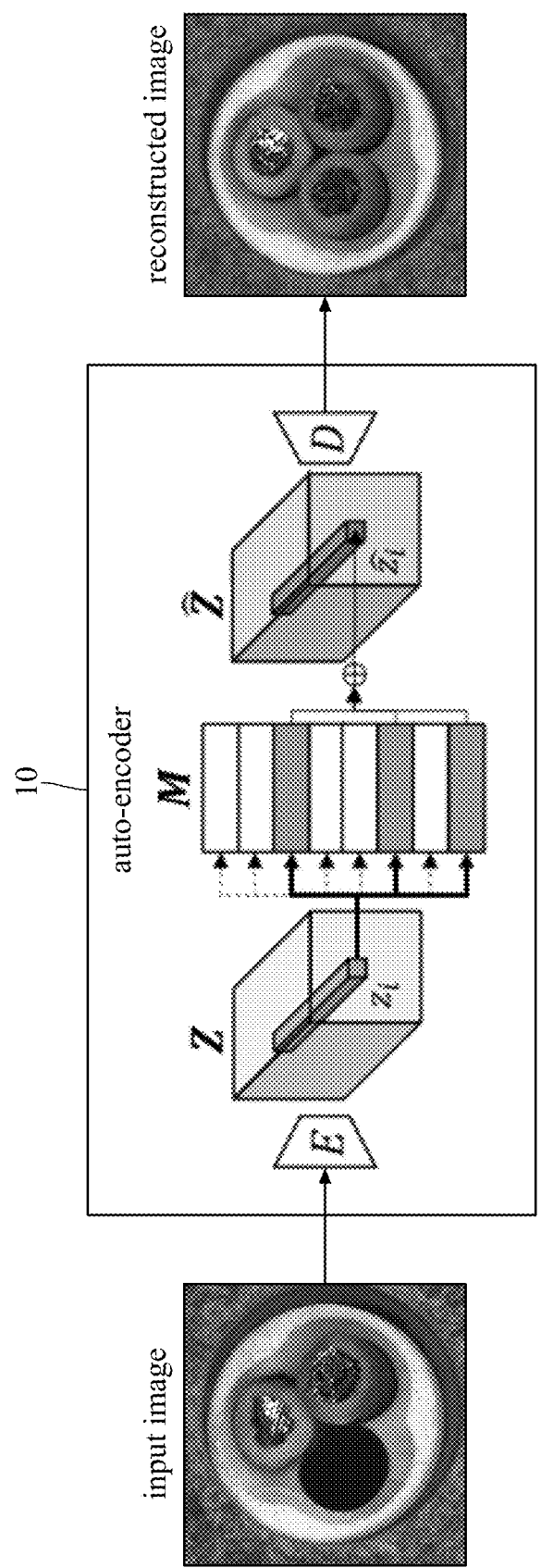
FIG. 1 is an architecture diagram of the reconstruction model according to an embodiment of the present disclosure.

FIG. 1 is an architecture diagram of the reconstruction model according to an embodiment of the present disclosure. This reconstruction model adopts a memory-augmented auto-encoder (MemAE) 10, and combines with a sparse memory addressing mechanism and an updating process of a trust region mechanism proposed in the present disclosure.

Figure 2:
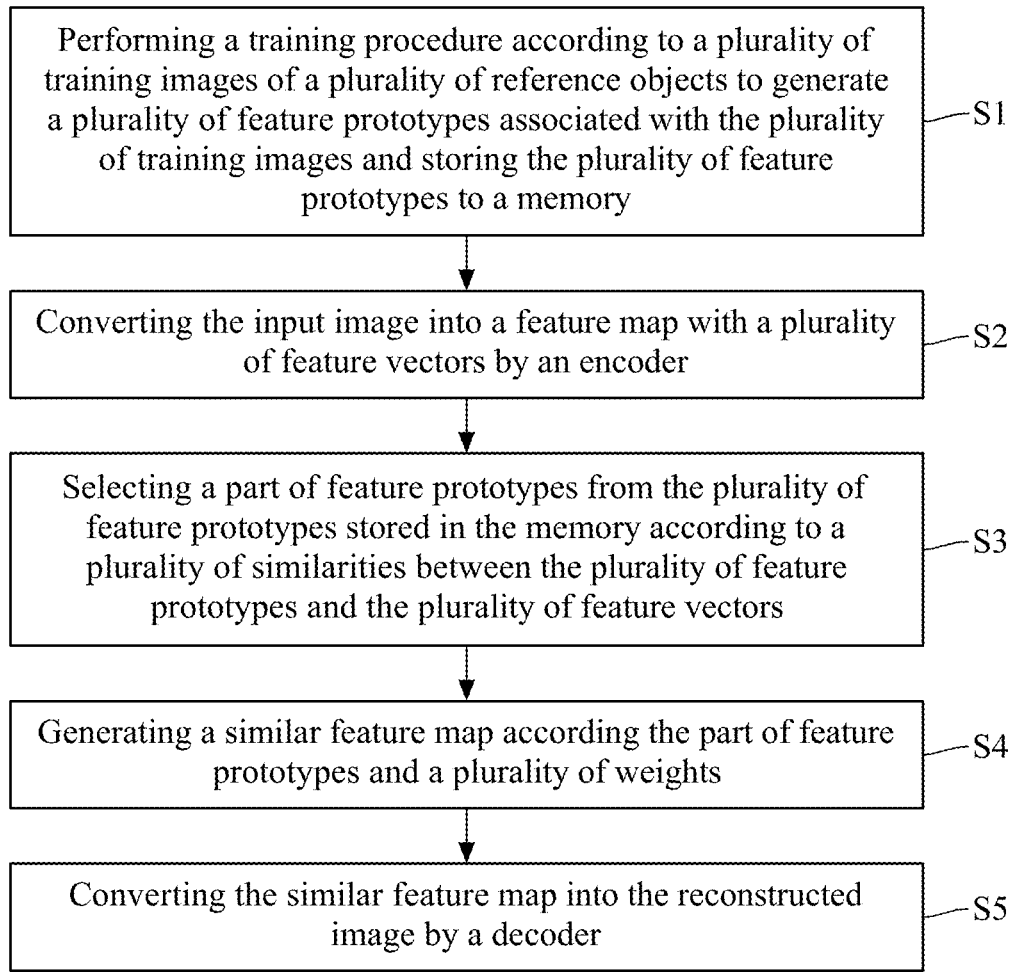
FIG. 2 is a flowchart of a method for generating a reconstructed image according to an embodiment of the present disclosure.

The memory-augmented auto-encoder 10 stores feature prototypes of a normal image in memory banks and reconstructs a normal version of the input image from memory. The sparse addressing provides a selection mechanism of memory slots. The updating process of the trust region may prevent the memory from storing unwanted defect features. FIG. 2 is the flowchart of the method for generating the reconstructed image according to an embodiment of the present disclosure. Every component shown in FIG. 1 will be described together with steps shown in FIG. 2 as follows.

Step S1 shows "performing a training procedure according to a plurality of training images of a plurality of reference objects to generate a plurality of feature prototypes associated with the plurality of training images and storing the plurality of feature prototypes to a memory". Step S1 is the training stage of the reconstruction model. The plurality of training images refers to images of a plurality of reference objects. The reference objects and target objects are objects of the same classification, such as the top cover of the laptop. Compared to the target object, the reference object does not have defects (or the defect can be neglected). Therefore, the training images are normal images without defects (meaning the normal images are images of objects without defects). The feature prototypes are associated with these training images.

Step S2 shows "converting the input image into a feature map with a plurality of feature vectors by an encoder". Step S2 is an inference state of the reconstruction model.

The present disclosure uses an external memory module M to store a set of standard feature prototypes, and thereby avoiding the defects to be reconstructed. These feature prototypes are configured to generate the reconstructed image. At the inference stage, the set of feature prototypes are fixed, which makes it harder for the auto-encoder to reconstruct defects because the memory module M only contains normal features.

As shown in FIG. 1, the standard auto-encoder follows an encoder-decoder structure wherein an encoder E projects the input image $x \in R^{H \times W}$ with length H and width W into a lower-dimensional latent space. The memory module M is implemented as a tensor $M \in R^{M \times Z}$ where M denotes the number of memory slots, and Z denotes the dimensions of the latent vector z.

As step S2 shown in FIG. 2, the present disclosure first computes a latent representation $Z=E(x)$ of the input image x. It should be noticed that in order to preserve the spatial information, the present disclosure designs the encoder E to produce a feature map $Z \in R^{h \times w \times Z}$ with a lower resolution than the original input image. The feature map is the result of the feature vector to the latent space. For convenience, the present disclosure uses $z_i \in R^Z$ to refer to the $i^{th}$ element of Z. Each vector $z_i$ in Z represents features of a patch in the input image x. $z_i$ is the feature vector mentioned in step S2.

Step S3 shows "selecting a part of feature prototypes from the plurality of feature prototypes stored in the memory according to a plurality of similarities between the plurality of feature prototypes and the plurality of feature vectors". The implementation details of step S3 will be described later when sparse addressing is described.

Step S4 shows "generating a similar feature map according the part of feature prototypes and a plurality of weights". The similar feature map consists of a plurality of similar feature vectors. Instead of passing the features map Z directly to the decoder D, the present disclosure computes approximate features $\hat{Z}_l$ for every $z_i$ using a convex combination of the feature prototypes stored in the memory module M. The following Equation 1 defines the memory addressing operation, where w is a weight vector indicating how similar z is with each of the feature prototypes stored in the memory module M.

$$\hat{z} = \omega M, \qquad \text{(Equation 1)}$$

$$\sum_{i=1}^{M} \omega_i = 1$$

In step S3, the weight vector w acts as a soft-addressing mechanism that retrieves the closest feature prototypes from the memory that are necessary for reconstruction. The present disclosure measures the similarity between the feature vector z and the memory items $M_i$ using negative Euclidean distance and applies a softmax function to normalize the weights, as shown in Equation 2. Each memory item stores a feature prototype.

$$\omega_i = \frac{\exp(-\|z - M_i\|_2)}{\sum_{j=1}^{M}\exp(-\|z - M_j\|_2)}, \qquad \text{(Equation 2)}$$

$$i = \{1, \ldots, M\}$$

Step S5 shows "converting the similar feature map into the reconstructed image by a decoder". Specifically, the decoder D outputs a reconstructed image $\hat{X}=D(\hat{Z})$ using only approximate feature $\hat{Z}_l$ derived from the memory item.

Figure 3:
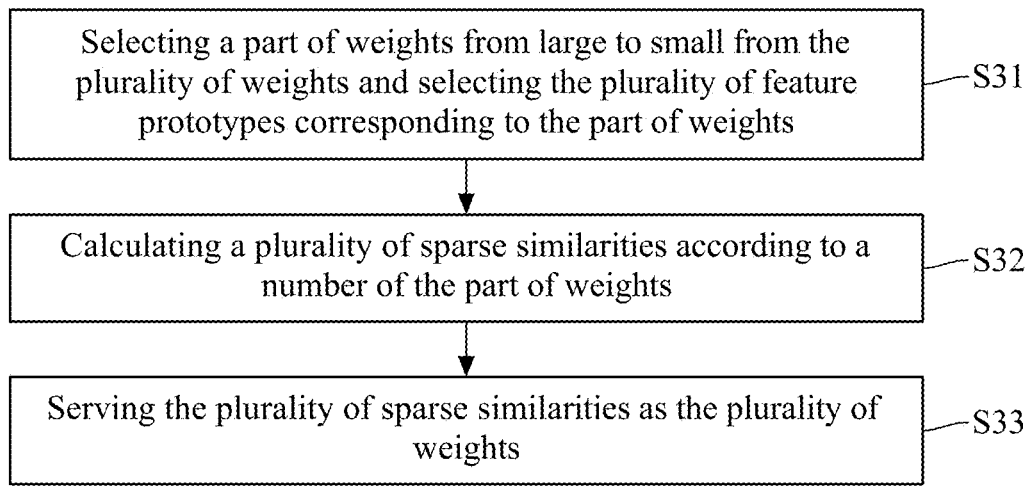
FIG. 3 is a detailed flowchart of step S3.

FIG. 3 is a detailed flowchart of step S3. Step S31 shows "selecting a part of weights from large to small from the plurality of weights and selecting the plurality of feature prototypes corresponding to the part of weights". Step S32 shows "calculating a plurality of sparse similarities according to a number of the part of weights". Step S33 shows "serving the plurality of sparse similarities as the plurality of weights".

The implementation details of step S3 are described as follows. Enforcing sparsity in memory addressing forces the model to approximate the feature vector z using fewer but more relevant memory items. It effectively prevents the model from unexpectedly combining several unrelated memory items to reconstruct defects. Moreover, it implicitly performs memory selection, and thus saving computation by removing items from the memory that were never accessed when reconstructing the image.

As shown in step S31, let superscript $w^{(1)}$ denote an ordinary rank indexing of the elements of w, where $w^{(1)} > w^{(2)} > \ldots > w^{(M)}$. As shown in step S32, the present disclosure computes a sparse approximation $\hat{w}$ of the weight vector w that corresponds to getting the k closet memory items following by a re-normalization step, as shown in Equation 3 and step S33, wherein $\mathbb{1}$ is the indicator function that returns a value of 1 if the condition inside is true and 0 otherwise.

$$\hat{\omega}^{(i)} = \frac{\omega^{(i)} \mathbb{1}\{i \leq k\}}{\sum_j \omega^{(j)} \mathbb{1}\{j \leq k\}} \quad \text{(Equation 3)}$$

Since the present disclosure only uses a selected few memory items for reconstruction, it is desirable to prevent the model from learning redundant memory items. Therefore, the present disclosure imposes a margin between the closet memory item $M^{(1)}$ and second closet memory item $M^{(2)}$ with respect to the input latent vector z, as shown in the following Equation 4.

$$L_{margin} = [\|z - M^{(1)}\|_2 - \|z - M^{(2)}\|_2 + 1]_+ \quad \text{(Equation 4)}$$

The mechanism of updating memory by trust region is described below.

Without the assumption that the training data set only contains normal samples, the memory-augmented auto-encoder 10 will treat defective samples as normal and learn to store the defect features into the memory, leading to poor defect detection performance. The present disclosure leverages on two key concepts to prevent defective samples from contaminating the memory: (1) Defects are rare and they do not always appear in the same location, which means that the proportion of defects at the patch level will be significantly smaller than the proportion of defects at the image level. (2) Normal data (the training image mentioned in step S1) have regularity in appearance, making it easier for the memory augmented auto-encoder 10 to reconstruct normal image as compared to defects during the early stages of training. This implies that normal features are initially mapped closer to the memory items than defective features.

Figure 4:
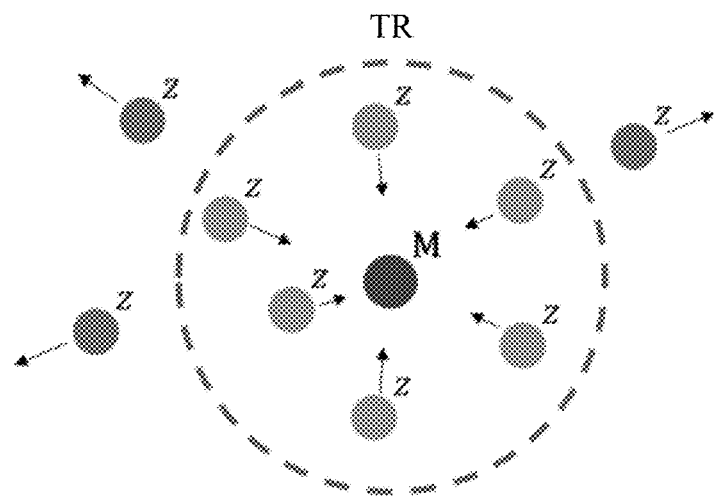
FIG. 4 is a schematic diagram of a trust region.

FIG. 4 is a schematic diagram of a trust region. As shown in FIG. 4, the trust region TR comprises the memory item M and 6 patch features z, the remaining 3 patch features are outside the trust region TR. Based on the above concepts, the present disclosure updates memory items based on a specified trust region TR that pulls the features within the trust region towards the closest memory item M and pushes the features outside of the region away from the memory item M, as illustrated by the arrows' directions shown in FIG. 4.

The "training procedure" mentioned in step S1 is a process for optimizing every feature prototype. Please refer to FIG. 5 and FIG. 6, which show two implementation methods of step S1.

Step S11 shows "setting a default feature prototype". In this step, starting from the first training image, every memory slot is initialized.

Step S12 shows "for each of the plurality of training images, dividing the training image into a plurality of patches". For example, the training image having the top cover of the laptop is divided into 3×3 grids, and each grid represents a patch.

Step S13 shows "converting the plurality of patches into a plurality of patch features respectively by the encoder", and the distribution of these patch features are shown in FIG. 4.

Step S14 shows "calculating a plurality of distances between the plurality of patch features and the default feature prototypes".

Step S15 shows "saving at least one patch feature whose distance is smaller than a threshold". The threshold is an average of the plurality of distances calculated in step S14, and this threshold equals to the radius of the trust region TR shown in FIG. 4.

Step S16 shows "updating the default feature prototype as one of the plurality of feature prototypes according to the saved at least one patch features". Specifically, the memory item M is served as a center and the trust region TR is formed by a specific radius, and thus the feature space inside the trust region TR and the feature space outside of the trust region TR can be separated, as shown in the following Equation 5. All items within $\delta_1$ radius are considered normal features that should be to pulled closer to each other, while all items outside are considered potential defects that should be pushed farther away. To prevent the model from pushing the defective features to infinity, the present disclosure ignores those items farther than a predefined trust threshold $\delta_2$. The above description corresponds to the process of steps S15-S16.

$$r(z, M^{(1)}) = \begin{cases} 1 & \|z - M^{(1)}\|_2 \leq \delta_1 \\ -1 & \delta_1 < \|z - M^{(1)}\|_2 \leq \delta_2 \\ 0 & \text{otherwise} \end{cases} \quad \text{(Equation 5)}$$

Since patches that are easy to reconstruct tend to have smaller distances to the memory slots than patches that are harder to reconstruct, it requires $\delta_1$ to be adaptive to each of these cases. The present disclosure first calculates a plurality of distances between the plurality of features $z_i$ corresponding to all of patches of the current input image and each memory items $M_i$, as described in step S14. The present disclosure then sets $\delta_1$ to be the average of these distances, as described in step S15, the closest one or more memory items $M_i$ may be retrieved accordingly, and these memory items $M_i$ are updated, as described in step S16. Since normal features are abundant and are similar to each other, normal features will mostly be pulled closer to the memory item and only occasionally pushed out. On the other hand, defect features will always be pushed out since they would always be farther than the average distance. It is possible to avoid contamination of memory items by defective features through the above method.

Figure 5:
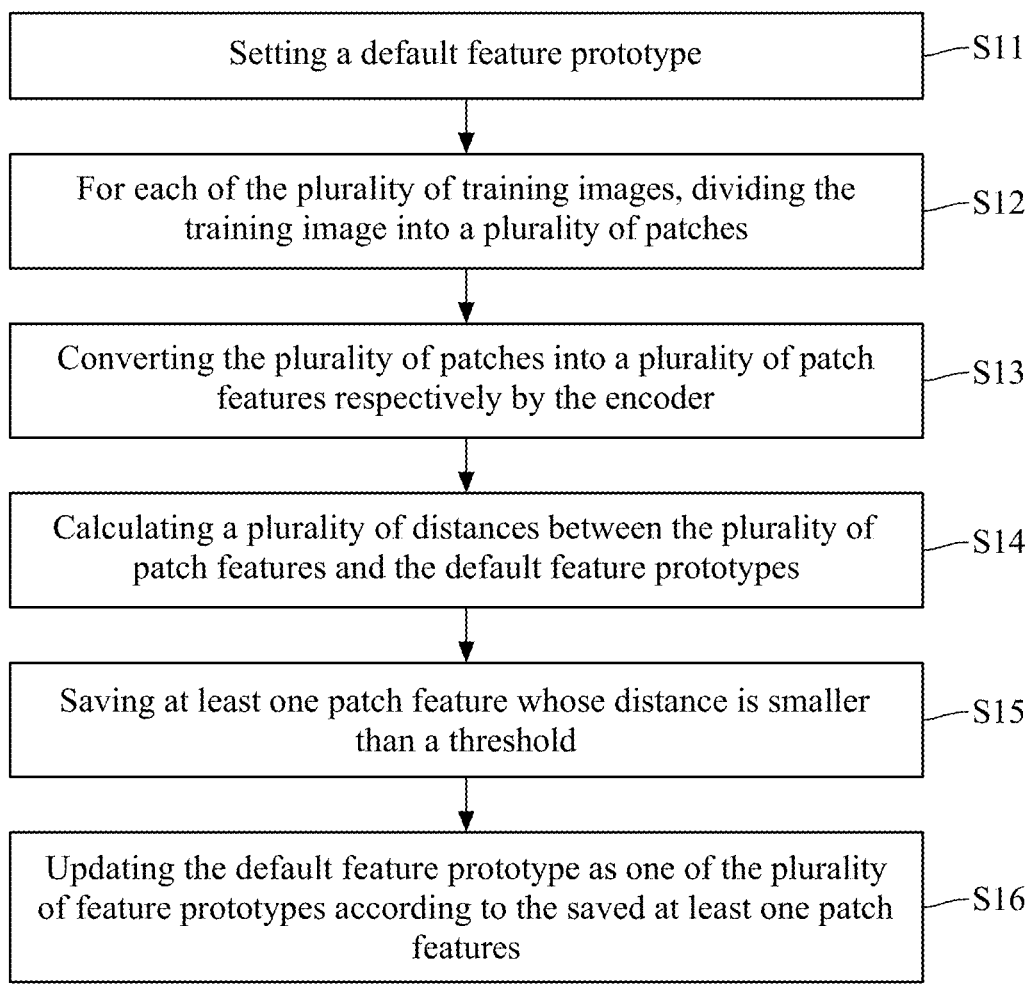
FIG. 5 and FIG. 6 are detailed diagrams of two implementations of step S1.
Figure 6:
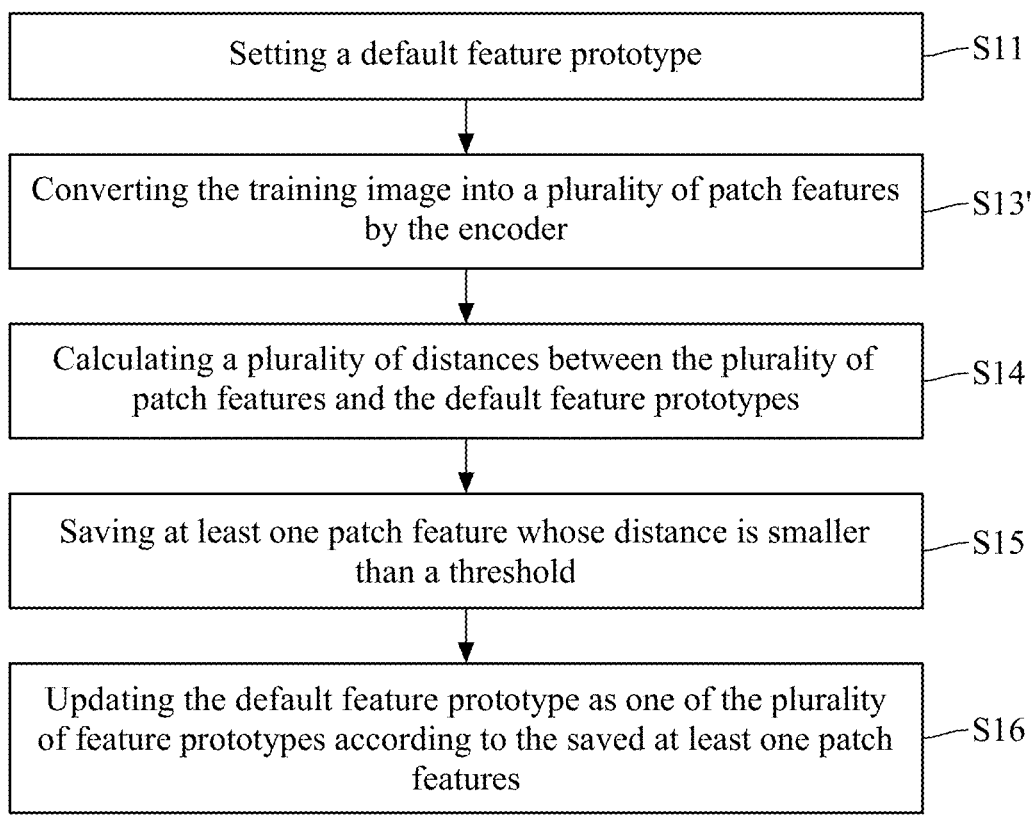

Please refer to FIG. 6, which shows another embodiment of step S1. The difference between FIG. 6 and FIG. 5 is that FIG. 6 does not have step S12, and step S13' of FIG. 6 is different from step S13 of FIG. 5. In the embodiment of FIG. 5, the training image is actually divided into multiple patches in step S12, such as patch1-patch9, and features of patches 1-9 are calculated respectively in step S13. In other words, the encoder E obtains patch features at the patch-level. On the other hand, step S13' in FIG. 6 shows "for each of the plurality of training images, converting the training image into a plurality of patch features by the encoder". In step S13', the encoder E obtains patch features at the image-level directly. For example, the patch feature 1 obtained in step S13' is a linear combination of patch features 2, 3, 5 obtained in step S13, and patch feature 2 obtained in step S13' is a linear combination of patch features 2, 6, 7, and 9 obtained in step S13.

The present disclosure implements the trust region updates as an additional loss function defined in Equation 6, where $M^{(1)}$ denotes the closest memory item in M with respect to z.

$$L_{trust}=r(z,M^{(1)})\|z-M^{(1)}\|_2 \qquad \text{(Equation 6)}$$

The reconstruction model of the present disclosure employs a plurality of loss functions in the training stage. These loss functions comprise reconstruction loss $L_{rec}$, SSIM loss $L_{sm}$, VGG feature loss $L_{vgg}$, GAN loss $L_{GAN}$, and GAN feature loss $L_{feat}$. Please refer to the documents listed in the following paragraph for more details on these loss functions. The total loss function is then defined in the following Equation 7, where the λ coefficients are hyper-parameters that control the relative weighting of each term.

$$L_{total}=\lambda_{rec}L_{rec}+\lambda_{sm}L_{sm}+\lambda_{vgg}L_{vgg}+\lambda_{GAN}L_{GAN}+\lambda_{feat}L_{feat}+\lambda_{margin}L_{margin}+\lambda_{trust}L_{trust} \qquad \text{(Equation 7)}$$

Reconstruction loss: Taesung Park, Ming-Yu Liu, Ting-Chun Wang, and Jun-Yan Zhu. Semantic image synthesis with spatially-adaptive normalization. In Proceedings of the IEEE Conference on Computer Vision and Pattern Recognition, 2019.

SSIM loss: Paul Bergmann, Sindy Lowe, Michael Fauser, David Sattlegger, and Carsten Steger. Improving unsupervised defect segmentation by applying structural similarity to autoencoders. In Proceedings of the 14th International Joint Conference on Computer Vision, Imaging and Computer Graphics Theory and Applications (VISIGRAPP), pages 372-380, 2019.

VGG feature loss: Justin Johnson, Alexandre Alahi, and Li Fei-Fei. Perceptual losses for real-time style transfer and super-resolution. In European conference on computer vision, pages 694-711. Springer, 2016.

GAN loss: Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pages 2672-2680, 2014.

GAN feature loss: Ting-Chun Wang, Ming-Yu Liu, Jun-Yan Zhu, Andrew Tao, Jan Kautz, and Bryan Catanzaro. High-resolution image synthesis and semantic manipulation with conditional gans. In Proceedings of the IEEE conference on computer vision and pattern recognition, pages 8798-8807, 2018. 4, and Xiangyu Xu, Deqing Sun, Jinshan Pan, Yujin Zhang, Hanspeter Pfister, and Ming-Hsuan Yang. Learning to superresolve blurry face and text images. In Proceedings of the IEEE International Conference on Computer Vision, pages 251-260, 2017.

Figure 7:
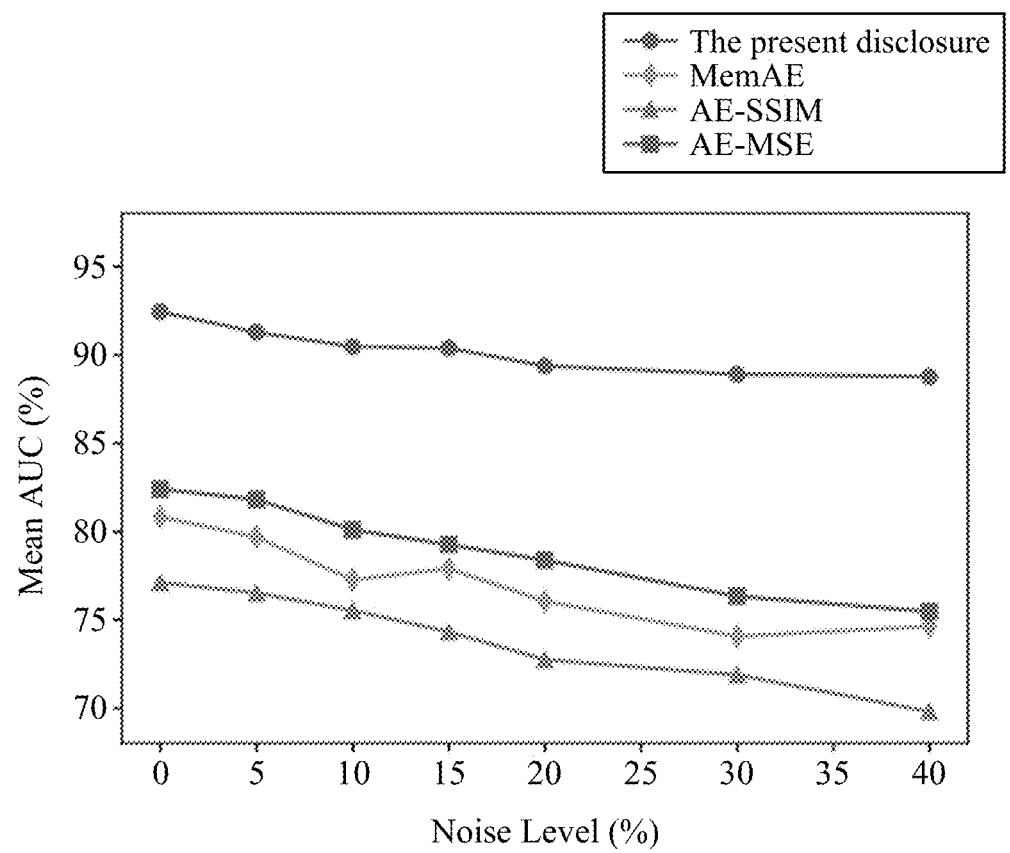
FIG. 7 is a comparison diagram of the reconstruction model proposed by the present disclosure and other models against noise data.

When auto-encoder is used, in order to solve the over-generalization problem, the present disclosure needs to limit the latent space effectively such that the auto-encoder may still reconstruct normal image regions without reconstructing defects. For this purpose, the present disclosure devises a scheme inspired by memory-augmented auto-encoder with several significant differences. The present disclosure adopts a memory to store the latent space. During the memory update phase, the present disclosure increases the sparsity such that the updated information focus only on few memory slots. Additionally, the present disclosure provides the mechanism of trust regions, which essentially classify defective latent space samples and avoid noisy samples from polluting the memory slots. The reconstruction model of the present disclosure is resilient to noise and achieves good performance even when the training data contain over 40% of defective images (meaning images of defected objects). Please refer to FIG. 7. The horizontal axis of FIG. 7 shows the noise proportion of the input image, and the vertical axis uses the area under curve (AUC) as the estimation index, which can be served as the accuracy of the reconstructed image. FIG. 7 shows that when the noise proportion is near 40%, the reconstruction model proposed by the present disclosure still has the accuracy near 90%. Compared to the model only using the auto-encoder, or the model using the auto-encoder combining other loss functions, the accuracy of the reconstruction model proposed by the present disclosure surpasses other models by more than 10%.

Given a dataset containing both normal and defective images, the reconstruction model trained by the present disclosure may distinguish normal from defective images without accessing labels that differentiate the two. Moreover, by treating small imperfections as defects, the present disclosure may reduce the percentage of defect-free images in the dataset. Consequently, the present disclosure utilizes both the normal images and the good image patches within the defective images to increase the available data for training, which means the model should be robust against noise (defect images).

In view of the above, the method for generating a reconstructed image proposed in the present disclosure has the following contributions: a defect classification framework implemented by the present disclosure is resilient to noise in the training dataset, the novel sparse memory addressing scheme proposed in the present disclosure may avoid over-generalization of memory slots for the auto-encoder, and the memory update scheme using trust regions may avoid noise contamination in memory slots during the training stage.

What is claimed is:

1. A method for generating a reconstructed image adapted to an input image having a target object, comprising:
   converting the input image into a feature map with a plurality of feature vectors by an encoder;
   performing a training procedure according to a plurality of training images of a plurality of reference objects to generate a plurality of feature prototypes associated with the plurality of training images and storing the plurality of feature prototypes to a memory;
   selecting a part of feature prototypes from the plurality of feature prototypes stored in the memory according to a plurality of similarities between the plurality of feature prototypes and the plurality of feature vectors;
   generating a similar feature map according the part of feature prototypes and a plurality of weights, wherein each of the plurality of weights represents each of the similarities between the part of feature prototypes and the plurality of feature vectors; and
   converting the similar feature map into the reconstructed image by a decoder, wherein the encoder, the decoder and the memory form an auto-encoder.

2. The method for generating the reconstructed image of claim 1, wherein selecting the part of feature prototypes from the plurality of feature prototypes stored in the memory according to the plurality of similarities between the plurality of feature prototypes and the plurality of feature vectors comprises:
   selecting a part of weights from large to small in the plurality of weights;
   selecting the plurality of feature prototypes corresponding to the part of weights;
   calculating a plurality of sparse similarities according to a number of the part of weights; and serving the plurality of sparse similarities as the plurality of weights.

3. The method for generating the reconstructed image of claim 1, wherein performing the training procedure according to the plurality of training images of the plurality of reference objects comprises:
setting a default feature prototype;
for each of the plurality of training images, dividing the training image into a plurality of patches;
converting the plurality of patches into a plurality of patch features respectively by the encoder;
calculating a plurality of distances between the plurality of patch features and the default feature prototype;
saving at least one patch feature whose distance is smaller than a threshold; and
updating the default feature prototype as one of the plurality of feature prototypes according to the saved at least one patch features.

4. The method for generating the reconstructed image of claim 1, wherein performing the training procedure according to the plurality of training images of the plurality of reference objects comprises:
setting a default feature prototype;
for each of the plurality of training images, converting the training image into a plurality of patch features by the encoder;
calculating a plurality of distances between the plurality of patch features and the default feature prototype;
saving at least one patch feature whose distance is smaller than a threshold; and
updating the default feature prototype as one of the plurality of feature prototypes according to the saved at least one patch feature.

5. The method for generating the reconstructed image of claim 1, wherein the plurality of weights is calculated by the following equation:

$$\omega_i = \frac{\exp(-\|z - M_i\|_2)}{\sum_{j=1}^{M} \exp(-\|z - M_j\|_2)},$$

$$i = \{1, \ldots, M\},$$

where $w_i$ is the $i^{th}$ weight, z is one of the plurality of feature vectors, $M_i$ is the $i^{th}$ feature prototype stored in the memory, and M is a number of slots of the memory.

6. The method for generating the reconstructed image of claim 3, wherein the threshold is an average of the plurality of distances.

7. The method for generating the reconstructed image of claim 3, wherein the auto-encoder has a loss function associated with the following equation:

$$L_{trust} = r(z, M^{(1)}) \|z - M^{(1)}\|_2,$$

wherein $L_{trust}$ is one term in the loss function, z is one of the plurality of feature vectors, $M^{(1)}$ is one of the plurality of feature prototypes that is closest to z, and $r(z, M^{(1)})$ is configured to indicate whether a distance between z and M is smaller than the threshold.

8. The method for generating the reconstructed image of claim 7, wherein $r(z, M^{(1)})$ is calculated by the following equation:

$$r(z, M^{(1)}) = \begin{cases} 1 & \|z - M^{(1)}\|_2 \leq \delta_1 \\ -1 & \delta_1 < \|z - M^{(1)}\|_2 \leq \delta_2, \\ 0 & \text{otherwise} \end{cases}$$

wherein $\delta_1$ is the threshold and $\delta_2$ is another threshold greater than $\delta_1$.

* * * * *